US009017748B2

(12) United States Patent
Spelman et al.

(10) Patent No.: US 9,017,748 B2
(45) Date of Patent: Apr. 28, 2015

(54) POTASSIUM FORTIFICATION IN FOODSTUFFS

(75) Inventors: Kieran Patrick Spelman, New City, NY (US); Barbara Jo Lyle, Deerfield, IL (US); Yi-Fang Chu, Glenview, IL (US); Jimbay P. Loh, Green Oaks, IL (US); Yeong-Ching Albert Hong, Kildeer, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 619 days.

(21) Appl. No.: 11/965,992

(22) Filed: Dec. 28, 2007

(65) Prior Publication Data

US 2009/0169685 A1 Jul. 2, 2009

(51) Int. Cl.
*A23L 1/304* (2006.01)
*A23L 2/52* (2006.01)
*A23L 2/68* (2006.01)

(52) U.S. Cl.
CPC . *A23L 1/304* (2013.01); *A23L 2/52* (2013.01); *A23L 2/68* (2013.01); *A23V 2002/00* (2013.01)

(58) Field of Classification Search
CPC .................. A23V 2002/00; A23V 2250/156; A23V 2200/15; A23V 2200/16; A23V 2250/16; A23L 2/52; A23L 1/304; A23L 2/02; A23L 1/237
USPC ........... 426/590, 74, 72, 599, 648, 330, 330.3
See application file for complete search history.

(56) References Cited

U.S. PATENT DOCUMENTS

| | | | |
|---|---|---|---|
| 4,038,421 A * | 7/1977 | Mendy et al. | 426/72 |
| 4,214,996 A | 7/1980 | Buddemeyer et al. | |
| 4,927,657 A * | 5/1990 | Antaki et al. | 426/589 |
| 5,310,570 A | 5/1994 | Kwapong et al. | |
| 5,322,857 A | 6/1994 | Chou | |
| 5,431,940 A | 7/1995 | Calderas et al. | |
| 5,478,582 A * | 12/1995 | Smith et al. | 426/250 |
| 5,629,023 A | 5/1997 | Bland | |
| 5,637,324 A | 6/1997 | Bland | |
| 5,871,797 A | 2/1999 | Henson | |
| 5,928,691 A | 7/1999 | Reddy et al. | |
| 5,955,136 A | 9/1999 | Laaman et al. | |
| 6,020,017 A | 2/2000 | Mingione | |
| 6,036,985 A | 3/2000 | Jacobson et al. | |
| 6,056,989 A * | 5/2000 | Sasagawa et al. | 426/590 |
| 6,261,619 B1 | 7/2001 | Calderas et al. | |
| 6,268,003 B1 | 7/2001 | Calderas et al. | |
| 6,294,214 B1 | 9/2001 | Calderas et al. | |
| 6,440,482 B1 * | 8/2002 | Henson et al. | 426/590 |
| 6,730,336 B2 | 5/2004 | Villagran et al. | |
| 6,866,877 B2 | 3/2005 | Clark et al. | |
| 6,974,597 B2 | 12/2005 | Ohta et al. | |
| 7,033,629 B2 | 4/2006 | Koss et al. | |
| 7,572,471 B2 * | 8/2009 | Lee et al. | 426/330.3 |
| 8,545,912 B2 * | 10/2013 | Crouse et al. | 426/74 |
| 2002/0037353 A1 | 3/2002 | Villagran et al. | |
| 2002/0122866 A1 * | 9/2002 | Palaniappan et al. | 426/599 |
| 2002/0176881 A1 | 11/2002 | Verlaan et al. | |
| 2002/0192331 A1 | 12/2002 | Nauth | |
| 2003/0113408 A1 | 6/2003 | Clark et al. | |
| 2005/0170020 A1 | 8/2005 | Medasani et al. | |
| 2007/0003670 A1 | 1/2007 | Jendrysik et al. | |
| 2008/0118603 A1 * | 5/2008 | Lada et al. | 426/66 |
| 2008/0206412 A1 | 8/2008 | Leclerc | |

FOREIGN PATENT DOCUMENTS

| | | |
|---|---|---|
| AT | 413 069 B | 11/2005 |
| EP | 0 117 653 A1 | 9/1984 |
| EP | 0 117 653 B1 | 7/1987 |
| EP | 0 507 157 A1 | 10/1992 |
| EP | 0 507 157 B1 | 3/1995 |
| EP | 0 677 249 B1 | 5/2001 |
| EP | 1 295 536 A1 | 3/2003 |
| JP | 63-36763 A | 2/1988 |
| KR | 10-2007-0001840 A | 1/2007 |
| NZ | 281084 A | 7/1998 |
| RU | 2005391 C1 | 1/1994 |
| RU | 2 287 302 C2 | 11/2006 |
| WO | 96/03059 A1 | 2/1996 |
| WO | 2004/068957 A1 | 8/2004 |
| WO | 2005/115423 A1 | 12/2005 |
| WO | 2006/097629 A1 | 9/2006 |

OTHER PUBLICATIONS

Institute of Medicine of the National Academies, ch. 5, Potassium, in Dietary Reference Intakes for Water, Potassium, Sodium, Chloride, and Sulfate, pp. 186-268 (Wa. D.C. 2004).
Notice of Opposition to Grant of Patent (Section 21) upon New Zealand Application No. 572865 by Fonterra Co-Operative Group Limited dated Nov. 30, 2010, 2 pages.
Amended Notice of Opposition to Grant of Patent (Section 21) upon New Zealand Application No. 572865 by Fonterra Co-Operative Group Limited dated Mar. 7, 2011 (2 pages) and Statement of Case (13 pages).
Roger Boulton, "The Relationships Between Total Acidity, Titratable Acidity and pH in Wine," American Society for Enology and Viticulture, vol. 31, No. 1, 1980, pp. 76-80.

* cited by examiner

*Primary Examiner* — Michele L. Jacobson
*Assistant Examiner* — Hong T Yoo
(74) *Attorney, Agent, or Firm* — Fitch, Even, Tabin & Flannery LLP

(57) ABSTRACT

Improved methods for potassium fortification in food products and the resulting potassium-fortified food products produced therefrom are provided. The methods of this invention allow significant levels of potassium fortification (i.e., greater than about 10 percent, and even up to about 50 percent, of the current U.S. Daily Values (DV) in a single serving) without the objectionable and unpleasant taste profile normally associated with current methods of potassium fortification.

6 Claims, No Drawings

POTASSIUM FORTIFICATION IN FOODSTUFFS

FIELD OF THE INVENTION

The present invention relates to improved methods for potassium fortification in food products and the potassium-fortified food products produced therefrom. The methods of this invention allow significant levels of potassium fortification (i.e., greater than about 10 percent, and even up to about 50 percent, of the current U.S. Daily Values (DV) without the objectionable and unpleasant taste profile normally associated with current methods of potassium fortification.

BACKGROUND OF THE INVENTION

Food products manufactured for public consumption are often modified by adding nutritional or other types of supplements in order to enhance their nutritional properties. Nutritional fortification of products may include supplementation with nutrients that benefit the overall state of health of the human body. Examples of nutritional fortification include supplementation by vitamins, minerals, and comparable materials. These supplements are either absolutely essential for human metabolism or enhance the provision of substances that may not be available in sufficient amounts in a normal diet.

Potassium is one such essential nutrient. Potassium is the major intracellular cation in the human body and is required for normal cellular function, especially for transmission of nerve impulses, contraction of muscles, and the like. Almost 98 percent of the potassium content of a healthy individual is contained within the cells; only about 2 percent of total body potassium is extracellular. Potassium is generally maintained at a concentration of about 145 mmol/L in intracellular fluid and at much lower levels in plasma and interstitial fluid (about 3.8 to 5 mmol/L). Excess potassium is generally excreted in the urine.

Severe potassium deficiency or hypokalemia is usually defined as a serum potassium concentration of less than 3.5 mmol/L (about 140 mg/L). Hypokalemia may result in cardiac arrhythmia, muscle weakness, and glucose intolerance. Moderate potassium deficiency may result in increased blood pressure, increased salt sensitivity, increased risk of kidney stones, and increased bone turnover. An inadequate intake of dietary potassium may also increase the risk of cardiovascular disease, particularly stroke.

Currently, the published Recommended Daily Allowance (RDA) or Daily Value (DV) for potassium is 3500 mg/day for adults in the United States. At present, dietary intakes of potassium in both the United States and Canada are considerably lower than this value. In recent surveys, the median intake of potassium by adults in the United States was approximately 2900 to 3200 mg (74 to 82 mmol)/day for men and 2100 to 2300 mg (54 to 59 mmol)/day for women; in Canada, the median intakes ranged from 3200 to 3400 mg (82 to 87 mmol)/day for men and 2400 to 2600 mg (62 to 67 mmol)/day for women. "Dietary Reference Intakes for Water, Potassium, Sodium, Chloride, and Sulfate," ISBN: 0-309-53049-0, 640 pages, (2004) (http://www.nap.edu/catalog/10925.html) (Chapter 5, pages 186-268, specifically relates to potassium).

Significant natural sources of potassium in the human diet include, for example, fresh fruits, especially bananas (e.g., a medium banana contains about 425 mg potassium), green leafy vegetables, grains, legumes, and potatoes. The conjugate anions of potassium found in such natural sources are generally organic anions, such as citrate, that can be converted in the body to bicarbonate. The bicarbonate can act as a buffer, thereby neutralizing diet derived acids such as sulfuric acid generated from sulfur-containing amino acids commonly found in meats and other high protein foods. Unfortunately, potassium as well as other nutrients, can be lost during conventional food processing. Thus, conventional process food products are generally considered not to be a good source of potassium. Typically, potassium fortification is carried out by adding potassium chloride or basic potassium salts directly to food, by using tabulation or encapsulation techniques, or by incorporating potassium-rich natural produce after removal of undesired components such as water and carbohydrate. Especially when potassium chloride is used to supplement, the buffering capacity is lost.

These prior art approaches are expensive and/or only of limited effectiveness, especially in high moisture foods and ready to use products. The relatively high levels of basic potassium salts required to deliver meaningful potassium fortification in food products generally result in an unpleasant aftertaste often characterized as bitter or soapy. Moreover, basic potassium salts reduce the total or titratable acidity of the product, which generally leads to even lower flavor impact. Thus, the potassium level obtained using conventional potassium fortification techniques in food products is generally limited to less than about 5 percent of the published DV values.

The present invention allows increased overall levels of potassium fortification, and thus improved levels of potassium delivery, while effectively eliminating off-taste and maintaining pH and total or titratable acidity levels at or near to equivalent non-potassium fortified food products. The invention provides high levels of potassium fortification in food products (e.g., up to about 50 percent of the published DV values) in a cost effective manner without adversely effected the flavor, pH, or total acidity profiles over a wide range of food products.

SUMMARY

The present invention relates to a method for preparing a potassium-fortified food product, said method comprising incorporating an amount of a potassium-fortifying composition into a food product, wherein the potassium-fortifying composition comprises at least one basic potassium salt and at least one inorganic acidic compound, wherein the amount of potassium-fortifying composition incorporated is sufficient to deliver at least about 350 mg potassium/single serving of the food product, wherein the at least one basic potassium salt and the at least one inorganic acidic compound are present in relative amounts to provide the potassium-fortified food product with a pH and a total acidity comparable to a similar non-potassium-fortified food product, and wherein the potassium-fortified food product has a taste comparable to the similar non-potassium-fortified food product. Preferably, the amount of potassium-fortifying composition is sufficient to deliver about 350 to about 1750 mg potassium/single serving of the food product. Preferably, the inorganic acidic compound also contains potassium. For purposes of this invention, the basic potassium salt is an edible potassium-containing salt having a higher pH than the inorganic acidic compound used in that particular potassium-fortifying composition. In other words, the basic potassium salt should be able to neutralize the inorganic acidic compound in order to balance the potassium level, pH, and total acidity of the resulting food product.

The present invention also relates to a potassium-fortified food product comprising a food product and an amount of a potassium-fortifying composition, wherein the potassium-fortifying composition comprises at least one basic potassium salt and at least one inorganic acidic compound, wherein the amount of potassium-fortifying composition in the potassium-fortified food product is sufficient to deliver at least about 350 mg potassium/single serving of the potassium-fortified food product, wherein the at least one basic potassium salt and the at least one inorganic acidic compound are present in the potassium-fortifying composition in such amounts so as to provide the potassium-fortified food product with a pH and a total acidity comparable to a similar non-potassium-fortified food product, and wherein the potassium-fortified food product has a taste comparable to the similar non-potassium-fortified food product. Preferably, the amount of potassium-fortifying composition is sufficient to deliver about 350 to about 1750 mg potassium/single serving of the food product. Preferably, the inorganic acidic compound also contains potassium. For purposes of this invention, "the amount of potassium-fortifying composition sufficient to deliver×mg potassium/serving" includes only the potassium derived from the potassium-fortifying composition and does not include any potassium that may normally be present in the food product into which the potassium-fortified composition is introduced. Thus, for example in a potassium-fortified beverage prepared with milk, the amount of potassium fortification would not take into account the amount of potassium contained in the milk. Thus, a potassium-fortified milk beverage containing sufficient potassium-fortified composition to provide about 350 to about 1750 mg potassium/single serving would contain, assuming the milk itself contained about 320 mg potassium/single serving, about 670 to about 2070 mg total potassium/single serving.

The present invention allows high levels of potassium fortification in a wide variety of food products without significantly impairing the microbiological stability or organoleptic properties of the food products. Indeed, the present invention allows incorporation of up to about 50 percent of the Daily Value for potassium in a single serving of the food product. This is a significant improvement over prior art methods where potassium fortification greater than only about 5 percent of the Daily Value generally resulted in significant loss of organoleptic properties (especially flavor properties). Types of food products which may be fortified with potassium as described herein include, but are not limited to, high moisture food products such as beverages, dressings, sauces, desserts, and the like. Beverages can include ready-to-drink beverage as well as beverages prepared from a powdered composition which is added to, for example, water, milk, and the like.

DETAILED DESCRIPTION

The present invention provides a method for preparing a potassium-fortified food product, said method comprising incorporating an amount of a potassium-fortifying composition into a food product, wherein the potassium-fortifying composition comprises at least one basic potassium salt and at least one inorganic acidic compound, wherein the amount of potassium-fortifying composition incorporated is sufficient to deliver at least about 350 mg potassium/single serving of the food product, wherein the at least one basic potassium salt and the at least one inorganic acidic compound are present in relative amounts to provide the potassium-fortified food product with a pH and a total acidity comparable to a similar non-potassium-fortified food product, and wherein the potassium-fortified food product has a taste comparable to the similar non-potassium-fortified food product. Preferably, the amount of potassium-fortifying composition is sufficient to deliver potassium in a range of about 350 to about 1750 mg potassium/single serving of the food product. Preferably, the inorganic acidic compound also contains potassium.

The present invention also provides a potassium-fortified food product comprising a food product and an amount of a potassium-fortifying composition, wherein the potassium-fortifying composition comprises at least one basic potassium salt and at least one inorganic acidic compound, wherein the amount of potassium-fortifying composition in the potassium-fortified food product is sufficient to deliver at least about 350 mg potassium/single serving of the potassium-fortified food product, wherein the at least one basic potassium salt and the at least one inorganic acidic compound are present in the potassium-fortifying composition in such amounts so as to provide the potassium-fortified food product with a pH and a total acidity comparable to a similar non-potassium-fortified food product, and wherein the potassium-fortified food product has a taste comparable to the similar non-potassium-fortified food product. Preferably, the amount of potassium-fortifying composition is sufficient to deliver about 350 to about 1750 mg potassium/single serving of the food product. Preferably, the inorganic acidic compound also contains potassium.

For purposes of this invention, the microbiological stability and organoleptic properties of the potassium-fortified food products are to be compared and evaluated relative to a similar food product without potassium fortification. The microbiological stability and organoleptic properties of the potassium-fortified food product should be similar to, and preferably closely approach, the microbiological stability and organoleptic properties of essentially the same food product but without potassium fortification.

The potassium-fortifying composition used in this invention comprises at least one basic potassium salt and at least one inorganic acidic compound. Of course, the basic potassium salts and the inorganic acidic compounds should be edible. Generally, the basic potassium salt or salts are at a higher concentration than the inorganic acidic compound or compounds in the potassium-fortifying composition and ultimately the potassium-fortified food product. The potassium-fortifying composition may be directly added and incorporated into the food product or the basic potassium salt or salts the inorganic acidic compound or compounds can be added separately. For purposes of this invention, the potassium-fortifying composition may be a separate composition containing both components which is then added to the food product or an in situ formed composition wherein the two components are added separately (in any order and either at the same time or at different times). It is generally preferred that the basic potassium salt or salts are added first and the inorganic acidic compound or compounds are added thereafter to adjust the pH and total acidity to the desired levels.

Suitable basic potassium salts include, for example, tripotassium citrate, dipotassium citrate, potassium lactate, potassium carbonate, potassium bicarbonate, potassium glycerophosphate, potassium fumarate, potassium tartrate, potassium bitartrate, potassium sodium tartrate, potassium malate, potassium gluconate, potassium adipate, potassium lactobionate, potassium acetate, dipotassium phosphate, tripotassium phosphate, potassium iodate, potassium iodide, potassium hydroxide, sodium potassium hexametaphosphate, and the like, as well as mixtures thereof. Generally, the preferred basic potassium salts are tripotassium citrate, dipotassium citrate, potassium lactate, dipotassium phosphate, potassium gluconate, and potassium glycerophosphate. Tripotassium citrate and dipotassium phosphate are the most preferred basic potassium salts for use in the present invention.

Suitable inorganic acidic compounds include both non-potassium-containing acidic compounds and potassium-containing acidic compounds. The use of potassium-containing acidic compounds will generally allow higher potassium fortification levels than non-potassium-containing acidic compounds. Suitable non-potassium acidic compounds for use in the present invention included, for example, hydrochloric acid, sulfuric acid, phosphoric acid, pyrophosphoric acid, sodium bisulfate, calcium acid sulfate, magnesium acid sulfate, monosodium phosphate, acidic calcium phosphate, sodium acid pyrophosphate, monocalcium phosphate, and the like as well as mixtures thereof. Suitable potassium acidic compounds for use in the present invention included, for example, potassium bisulfate, monopotassium phosphate, potassium acid pyrophosphate, and the like as well as mixtures thereof. Mixtures of non-potassium acidic compounds and potassium acidic compounds can also be used if desired.

Types of food products which may be fortified with potassium as described herein include, but are not limited to, high moisture food products such as beverages, dressings, sauces, desserts, and the like. Beverages can include ready-to-drink beverage as well as beverages prepared from a powdered composition which is added to, for example, water, milk, and the like. Of course, the specific basic potassium salts and inorganic acidic compounds used in a given food product should not adversely affect the desirable properties of the food product. Thus a potassium-fortified beverage prepared using milk should not use specific potassium salts and/or inorganic acidic compounds that cause the milk to curdle. Thus, for example, potassium bisulfate should not be used as the inorganic acidic compound in milk-based beverages since potassium bisulfate is known to curdle milk.

Although not wishing to be limited by theory, it is believed that the present invention allows higher potassium fortification without loss of organoleptic properties due to the ability to balance the potassium level, pH, and total acidity of the resulting food product by controlled addition of a basic potassium salt and an inorganic acidic compound. Generally, the basic potassium salt is added to the food product to achieve the desired level of potassium fortification. The inorganic acidic compound is added to adjust the pH and total acidity to levels suitable for the microbiological stability and organoleptic properties desired. The ability to increase the level of potassium is, of course, limited by the organoleptic properties of the final food product. In other words, for a given food product and fortifying system (i.e., specific basic potassium salt and inorganic acidic compound used and the pH and total acidity obtained), there will generally be a maximum potassium level that will allow good organoleptic properties; increasing the potassium level above this organoleptic maximum level will adversely effect the organoleptic properties. Generally, maximum potassium levels of at least about 40 or 50 percent of the DV per serving, depending on the specific system used, can be obtained using this invention. For specific combinations of food products and potassium-fortifying compositions, this organoleptic maximum value could be somewhat higher or lower. And, of course, potassium fortification at levels below this organoleptic maximum value can be used so long as the food product provides at least about 10 percent of the DV per serving.

Balancing the potassium, pH, and total acidity values to achieve the desired microbiological stability and organoleptic properties will generally result in a potassium-fortified food product having pH and total acidity values reasonably close to the pH and total acidity values of a similar, but non-potassium fortified, food product (i.e., essentially the same product without any added potassium-fortifying composition). Again, while not wishing to be limited by theory, it is believed that the pH significantly impacts the microbiological stability and the total acidity significantly impacts the organoleptic properties. Although we believe that pH and total acidity mainly impact different properties as just noted, it is the balancing of all parameters that achieves the overall microbiological stability and organoleptic properties desired.

For many food products, microbiological stability can be obtained below certain pH values (often specific for generally classes of food products). Generally, conventional food products (i.e., without potassium fortification) of a given class are below these stability pH values, thereby providing microbiological stability. Thus, the pH of the potassium-fortified food product of this invention should have a pH below the stability value of the particular food product. For example, certain beverages (e.g., Crystal Light®, Tang®, and the like, whether ready-to-drink or prepared from a powdered composition) generally demonstrate microbiological stability at pH values below about 3.8. Thus, to achieve the desired microbiological stability, the corresponding potassium fortified beverages of this invention should have a pH of about 3.8 or lower.

With regard to total acidity, a potassium-fortified food product of the present invention should have a total acidity similar to the total acidity of the corresponding, non-potassium-fortified food product. For purposes of this invention, the total acidity for the potassium-fortified food product would be considered similar if it is within about ±10 percent of the total acidity of the corresponding, non-potassium-fortified food product. Preferably, the total acidity for the potassium-fortified food product is within about ±5 percent of the total acidity of the corresponding, non-potassium-fortified food product.

Unless otherwise indicated, all percentages and ratios in the present specification are by weight. All publications cited in the present specification are hereby incorporated by reference.

Example 1

This Example illustrates the preparation of ready-to-drink beverages fortified with potassium using the methods of this invention and commercially available ready-to-drink Pink Lemonade Crystal Light® (distributed by Kraft Foods North America). Tripotassium citrate was used as the major potassium fortification source (i.e., the basic potassium salt).

A sample of Pink Lemonade Crystal Light® without any additive was used as a control (Sample 1); the control sample contained about 40 mg potassium/serving. A baseline potassium-fortified sample was prepared by adding 4.93 g of tripotassium citrate to 300 mL of Pink Lemonade Crystal Light®; the amount of added potassium was sufficient to deliver about 1400 mg potassium per single serving (about 237 mL) which is equivalent to about 40 percent of the published DV value for potassium (about 1440 mg potassium per serving taking the initial potassium in the sample). The baseline potassium-fortified sample was then divided into three portions which were then used to make further samples. The first portion, to which no further additions were made, was simply used as a potassium-fortified control (Sample 2). The second portion was acidified with 0.495 percent (w/v) of sodium acid sulfate (i.e., a non-potassium-containing acidic compound) to form a first inventive sample (Sample 3) (i.e., about 1.49 g sodium acid sulfate per 300 mL of the beverage). The third portion was acidified with 0.495 percent (w/v) of potassium acid sulfate (i.e., a potassium-containing acidic compound) to form a second inventive sample (Sample 4) (i.e., about 1.49 g of potassium acid sulfate per 300 mL of the final beverage).

The samples were then evaluated and the following results were obtained.

| | Control Samples | | Inventive Samples | |
|---|---|---|---|---|
| | 1 | 2 | 3 | 4 |
| pH[†] | 3.0 | 5.3 | 4.5 | 4.6 |
| Total Acidity (as citric acid equivalent)[††] | 1.31 | 0.93 | 1.54 | 1.51 |
| Potassium (mg) per Serving* | 0 | 1400 | 1400 | 1750 |
| Total Potassium (mg) per Serving** | 40 | 1440 | 1440 | 1790 |
| Flavor | Good | Poor | Comparable to Sample 1 | Comparable to Sample 1 |

[†]Generally, the acceptable pH target range for this class of commercial products is about 2.7 to about 3.3 pH units; generally a pH below 3.8 is acceptable with regard to microbiological stability.
[††]Generally, the acceptable total acidity target range for this class of commercial products is about 1.04 to about 1.55.
*Based on the amount of added potassium (potassium from the original Crystal Light ® composition is not included).
**The total potassium includes potassium from the original Crystal Light ® composition in addition to added potassium.

Inventive samples 3 and 4 had good flavor profiles and microbiological stabilities while providing about 40 and 50 percent, respectively, of the Daily Value for potassium. Increasing the amount of potassium citrate in either samples 3 or 4 would degrade the flavor profiles. A comparison of inventive samples 3 and 4 demonstrates that the total potassium level can be raised if an potassium-containing acidic compound is used to adjust the pH and total acidity levels without degrading the flavor profile. The use of the potassium-containing acidic compound enables delivery of extra potassium fortificant once the major potassium fortifying source (in this case, potassium citrate) reaches its sensory limits.

Example 2

A powdered composition (i.e., Tang® Active Morning—a milk modifier containing cereal commercially available in Brazil—which contains about 108 mg potassium/serving) suitable for preparing a beverage using milk was used in this sample. Powdered compositions (15 g) containing various added amounts of potassium were prepared and then reconstituted in cold milk (200 mL). The milk used had a pH of about 6.8 and total acidity of about 0.05%; the milk itself provided about 309 mg potassium/serving.

Control Sample 1—powdered composition without any potassium containing additives; when reconstituted in 200 mL milk, the beverage contained about 417 mg total potassium/serving;

Comparative Sample 2—powdered composition containing sufficient added tripotassium citrate and dipotassium phosphate to provide about 425 mg additional potassium/serving; when reconstituted in 200 mL milk, the beverage contained about 738 mg total potassium/serving;

Comparative Sample 3—powdered composition containing sufficient added potassium citrate, dipotassium phosphate, and monopotassium phosphate to provide about 350 mg additional potassium/serving; when reconstituted in 200 mL milk, the beverage contained about 1611 mg total potassium/serving; the amount of monopotassium phosphate added was in excess of the amount need to neutralize the tripotassium citrate and dipotassium phosphate; and Inventive Sample 4—powdered composition containing sufficient added potassium citrate, dipotassium phosphate, and monopotassium phosphate to provide about 317 mg additional potassium/serving; when reconstituted in 200 mL milk, the resulting beverage contained about 734 mg total potassium/serving.

The basic potassium salts used in this evaluation were tripotassium citrate and dipotassium phosphate; the acidic compounds used were monopotassium phosphate and potassium bisulfate. Sample details and the results of this evaluation are provided in the following table:

| | Control/Comparative Samples | | | Inventive |
|---|---|---|---|---|
| | 1 | 2 | 3 | Sample 4 |
| Tripotassium Citrate (g)* | 0.3 | 1.0 | 0.6 | 0.83 |
| Dipotassium Phosphate (g) | 0 | 0.15 | 0.5 | 0.15 |
| Monopotassium Phosphate (g) | 0 | 0 | 3.0 | 0.2 |
| pH | 7.33 | 7.70 | 6.34 | 7.41 |
| Total Acidity (as citric acid equivalent) | 0.03 | 0.02 | 0.61 | 0.05 |
| Potassium (mg)/Serving** | 0 | 321 | 1228 | 317 |
| Total Potassium (mg)/Serving*** | 417 | 738 | 1645 | 734 |
| Flavor | Good | Poor (salty/soapy) | Poor (bitter/sour) | Comparable to Sample 1 |

*The original powdered Tang ® composition itself contained about 0.3 g tripotassium citrate/serving (equivalent to about 108 mg potassium/serving).
**Based on the amount of added potassium (potassium from the original Tang ® composition and the milk used to prepare the beverage are not included).
***The total potassium includes potassium from the original Tang ® composition and the milk used to prepare the beverage in addition to added potassium.

Inventive sample 4 had both pH and total acidity values, as well as flavor, comparable to that of control sample 1. Comparative samples 2 and 3 had significantly different pH and/or total acidity values as compared to control sample 1 and were defective with regard to organoleptic properties. Comparative sample 2 contained basic potassium salts but no acidic compounds to allow for the balancing of pH and total acidity. Comparative sample 3, on the other hand, contained an excess of the acidic compound and therefore had significantly different pH, total acidity, and organoleptic properties as compared to either the control sample 1 or inventive sample 4.

Example 3

This Example also illustrates the preparation of ready-to-drink beverages fortified with potassium using the methods of this invention and commercially available ready-to-drink Pink Lemonade Crystal Light® (distributed by Kraft Foods North America); the original ready-to-drink contained negligible potassium. Tripotassium citrate was used as the major potassium fortification source (i.e., the basic potassium salt) as in Example 1.

Tripotassium citrate (1.23 g) was added to 300 mL of Crystal Light® to deliver 350 mg of potassium for each 237 ml of serving (about 10 percent DV). This potassium-fortified Crystal Light® beverage was then split to four parts:

Control Sample 1—Crystal Light® with no added potassium or other additives;

Comparative Sample 2—potassium-fortified Crystal Light® with no additional additives;

Comparative Sample 3—potassium-fortified Crystal Light® with 0.16 percent (w/v) of citric acid (an organic acid); and Inventive Sample 4—potassium-fortified Crystal Light® with 0.12 percent (w/v) of sodium acid sulfate (an inorganic acid).

The samples were then evaluated and the following results were obtained.

|  | Control/Comparative Samples | | | Inventive |
|---|---|---|---|---|
|  | 1 | 2 | 3 | Sample 4 |
| pH[†] | 2.9 | 4.2 | 3.8 | 3.8 |
| Total Acidity (as citric acid equivalent)[††] | 1.31 | 1.18 | 1.79 | 1.38 |
| Potassium (mg) per Serving | 0 | 350 | 350 | 350 |
| Flavor | Good | Poor | Very Sour | Comparable to Sample 1 |

[†]Generally, the acceptable pH target range for this class of commercial products is about 2.7 to about 3.3 pH units; generally a pH below 3.8 is acceptable with regard to microbiological stability.
[††]Generally, the acceptable total acidity target range for this class of commercial products is about 1.18 to about 1.44.

Inventive sample 4 tasted very close to the control in terms of sourness and overall sensory profile. Thus, the combination of a potassium organic salt and an inorganic acid provided an excellent potassium fortification strategy in terms of managing both microbiology stability and sensory properties.

Example 4

This Example also illustrate the preparation of a potassium-fortified powdered composition that can be reconstituted with water to provide a potassium-fortified beverage. Commercially available powdered orange flavor Tang® (distributed by Kraft Foods North America) was first reconstituted with water by mixing powdered Tang® (31.6 g) int 300 mL water; then tripotassium citrate (1.23 g) was added. The original powdered Tang® contained negligible potassium. The order of addition of the components did not effect the beverage. The Tang® beverage was then divided into several portions to provide the following samples:

Control Sample 1—Tang® with no added potassium or other additives;

Comparative Sample 2—potassium-fortified Tang® with no additional additives;

Comparative Sample 3—potassium-fortified Tang® with 0.1 percent (w/v) of citric acid (an organic acid); and Inventive Sample 4—potassium-fortified Tang® with 0.1 percent (w/v) of sodium acid sulfate (an inorganic acid). Samples 2-4 delivered about 350 mg of potassium for each 237 ml of serving (about 10 percent DV).

The following results were obtained:

|  | Control/Comparative Samples | | | Inventive |
|---|---|---|---|---|
|  | 1 | 2 | 3 | Sample 4 |
| pH[†] | 3.06 | 3.96 | 3.8 | 3.8 |
| Total Acidity (as citric acid equivalent)[††] | 1.60 | 1.54 | 1.79 | 1.66 |
| Potassium (mg) per Serving | 0 | 350 | 350 | 350 |
| Flavor | Good | Poor | Very Sour | Comparable to Sample 1 |

[†]Generally, the acceptable pH target range for this class of commercial products is about 2.7 to about 3.3 pH units; generally a pH below 3.8 is acceptable with regard to microbiological stability.
[††]Generally, the acceptable total acidity target range for this class of commercial products is about 1.44 to about 1.76.

Inventive sample 4 tasted very close to the control in terms of sourness and overall sensory profile. Thus, the combination of a potassium organic salt and an inorganic acid again provided an excellent potassium fortification strategy in terms of managing both microbiology stability and sensory properties.

Example 6

This Example illustrates the preparation of a potassium-fortified salad dressing. Commercially available Kraft Italian Fat Free Dressing (distributed by Kraft Foods North America) was used; the dressing itself contained negligible potassium. Potassium L-lactate (11.3 g) was mixed with 180 g dressing to deliver about 350 mg potassium per single serving of dressing (about 30 g).

The dressing was then divided into several portions to provide the following samples:

Control Sample 1—dressing with no added potassium or other additives;

Comparative Sample 2—potassium-fortified dressing with no additional additives;

Comparative Sample 3—potassium-fortified dressing with 0.1 percent (w/v) of acetic acid (an organic acid); and Inventive Sample 4—potassium-fortified dressing with 0.1 percent (w/v) of sodium bisulfate (an inorganic acid).

The following results were obtained:

|  | Control/Comparative Samples | | | Inventive |
|---|---|---|---|---|
|  | 1 | 2 | 3 | Sample 4 |
| pH[†] | 3.00 | 4.22 | 4.00 | 3.8 |
| Total Acidity (as citric acid equivalent)[††] | 1.56 | 1.45 | 2.82 | 1.69 |
| Potassium (mg) per Serving | 0 | 350 | 350 | 350 |
| Flavor | Good | Poor | Very Sour | Comparable to Sample 1 |

[†]Generally, the acceptable pH target range for this class of commercial products is about 2.7 to about 3.3 pH units; generally a pH below 3.8 is acceptable with regard to microbiological stability.
[††]Generally, the acceptable total acidity target range for this class of commercial products is about 1.40 to about 1.72.

Inventive sample 4 was very close to the control dressing in terms of sourness and overall sensory profile. Thus, the combination of a potassium organic salt and an inorganic acid again provided an excellent potassium fortification strategy in terms of managing both microbiology stability and sensory properties.

What is claimed is:

1. A beverage with potassium fortification having a taste of the same beverage but without potassium fortification, the potassium-fortified beverage comprising
   a beverage;
   a potassium-fortifying composition added to the beverage;
   the potassium-fortifying composition including at least one basic potassium salt and at least one inorganic potassium containing acidic compound, wherein the at least one basic potassium salt has a higher concentration in the beverage than the at least one inorganic potassium containing acidic compound;
   the potassium-fortified beverage including an amount of potassium-fortifying composition sufficient to deliver about 1.5 to about 7.4 mg potassium/mL of the potassium-fortified beverage; and
   about 3 to about 5 times more of the at least one basic potassium salt than the at least one inorganic potassium containing acidic compound so that the at least one basic potassium salt and the at least one inorganic potassium containing acidic compound are present in relative amounts to provide the potassium-fortified beverage with a total acidity higher than a total acidity of the beverage without potassium fortification, to provide a total acidity difference from the total acidity of the beverage without potassium fortification of about 0.2 or less on a citric acid equivalent basis and to provide a pH of the potassium-fortified beverage within about 1.6 units of the pH of the beverage without potassium fortification so that the potassium fortified beverage has a taste of the same beverage but without potassium fortification;
   wherein the at least one basic potassium salt is tripotassium citrate, dipotassium citrate, potassium lactate, potassium carbonate, potassium bicarbonate, potassium glycerophosphate, potassium fumarate, potassium tartrate, potassium bitartrate, potassium sodium tartrate, potassium malate, potassium gluconate, potassium adipate, potassium lactobionate, potassium acetate, dipotassium phosphate, tripotassium phosphate, potassium iodate, potassium iodide, potassium hydroxide, sodium potassium hexametaphosphate, or mixtures thereof; and wherein the at least one inorganic potassium containing acidic compound is potassium bisulfate, monopotassium phosphate, potassium bitartrate, potassium acid pyrophosphate, potassium pyrophosphate, monopotassium citrate, or mixtures thereof.

2. The potassium-fortified beverage as defined in claim 1, wherein the at least one basic potassium salt is tripotassium citrate, dipotassium citrate, potassium lactate, dipotassium phosphate, potassium gluconate, potassium glycerophosphate, or mixtures thereof.

3. The potassium-fortified beverage as defined in claim 2, wherein the at least one basic potassium salt is tripotassium citrate or dipotassium phosphate.

4. The potassium-fortified beverage as defined in claim 1, wherein the at least one basic potassium salt is tripotassium citrate, dipotassium citrate, potassium lactate, dipotassium phosphate, potassium gluconate, potassium glycerophosphate, or mixtures thereof and wherein the at least one inorganic potassium containing acidic compound is potassium bisulfate, monopotassium phosphate, potassium acid pyrophosphate, or mixtures thereof.

5. The potassium-fortified beverage as defined in claim 4, wherein the at least one basic potassium salt is tripotassium citrate or dipotassium phosphate.

6. A beverage with potassium fortification having a taste of the same beverage but without potassium fortification, the potassium-fortified beverage comprising
   a beverage;
   a potassium-fortifying composition added to the beverage;
   the potassium-fortifying composition including at least one basic potassium salt and at least one inorganic potassium containing acidic compound, wherein the at least one basic potassium salt has a higher concentration in the beverage than the at least one inorganic potassium containing acidic compound;
   the potassium-fortified beverage including an amount of potassium-fortifying composition sufficient to deliver about 1.5 to about 7.4 mg potassium/mL of the potassium-fortified beverage; and
   about 3 to about 5 times more of the at least one basic potassium salt than the at least one inorganic potassium containing acidic compound so that the at least one basic potassium salt and the at least one inorganic potassium containing acidic compound are present in relative amounts to provide the potassium-fortified beverage with a total acidity higher than a total acidity of the beverage without potassium fortification, to provide a total acidity difference from the total acidity of the beverage without potassium fortification of about 0.2 or less on a citric acid equivalent basis and to provide a pH of the potassium-fortified beverage within about 1.6 units of the pH of the beverage without potassium fortification so that the potassium fortified beverage has a taste of the same beverage but without potassium fortification.

* * * * *